(12) United States Patent
Rivetta

(10) Patent No.: US 7,816,028 B2
(45) Date of Patent: Oct. 19, 2010

(54) ACCUMULATOR BATTERY CONTAINER WITH PLATE INSERTION SYSTEM, AND PLATE INSERTING METHOD

(75) Inventor: Cesare Rivetta, Inzago (IT)

(73) Assignee: Accuma S.p.A., Milan (IT)

( * ) Notice: Subject to any disclaimer, the term of this patent is extended or adjusted under 35 U.S.C. 154(b) by 1232 days.

(21) Appl. No.: 10/865,777

(22) Filed: Jun. 14, 2004

(65) Prior Publication Data
US 2005/0058899 A1   Mar. 17, 2005

(30) Foreign Application Priority Data
Sep. 11, 2003   (IT)   .................... MI2003A001751

(51) Int. Cl.
| H01M 6/42 | (2006.01) |
| H01M 2/00 | (2006.01) |
| H01M 2/04 | (2006.01) |
| B65D 1/24 | (2006.01) |
| B65D 1/36 | (2006.01) |
| B65D 25/04 | (2006.01) |
| B65D 57/00 | (2006.01) |
| B65D 85/00 | (2006.01) |

(52) U.S. Cl. ........................ 429/151; 429/163; 429/176; 429/149; 220/507
(58) Field of Classification Search ................ 429/163, 429/176, 151, 149; D13/103; 220/507
See application file for complete search history.

(56) References Cited

U.S. PATENT DOCUMENTS
| 2,154,841 A | 4/1939 | Gill |
| 4,384,031 A | 5/1983 | Kline et al. |
| 6,376,126 B1 | 4/2002 | Faust et al. |

FOREIGN PATENT DOCUMENTS
GB   1 349 648 A   4/1974

Primary Examiner—Gregg Cantelmo
Assistant Examiner—Eugenia Wang
(74) Attorney, Agent, or Firm—Modiano & Associati; Albert Josif; Daniel J. O'Byrne

(57) ABSTRACT

An accumulator battery container is constituted by a box-like structure that comprises internally at least one containment cell for at least one plate and adaptable guides provided for inserting and fixing in position the at least one plate, the cell being formed between opposite walls or between opposite walls and partitions of the container, and the guides being arranged at opposite ends of the cell and being formed so that they can undergo elastic deformation gradually when the at least one plate is inserted between them by pushing.

16 Claims, 5 Drawing Sheets

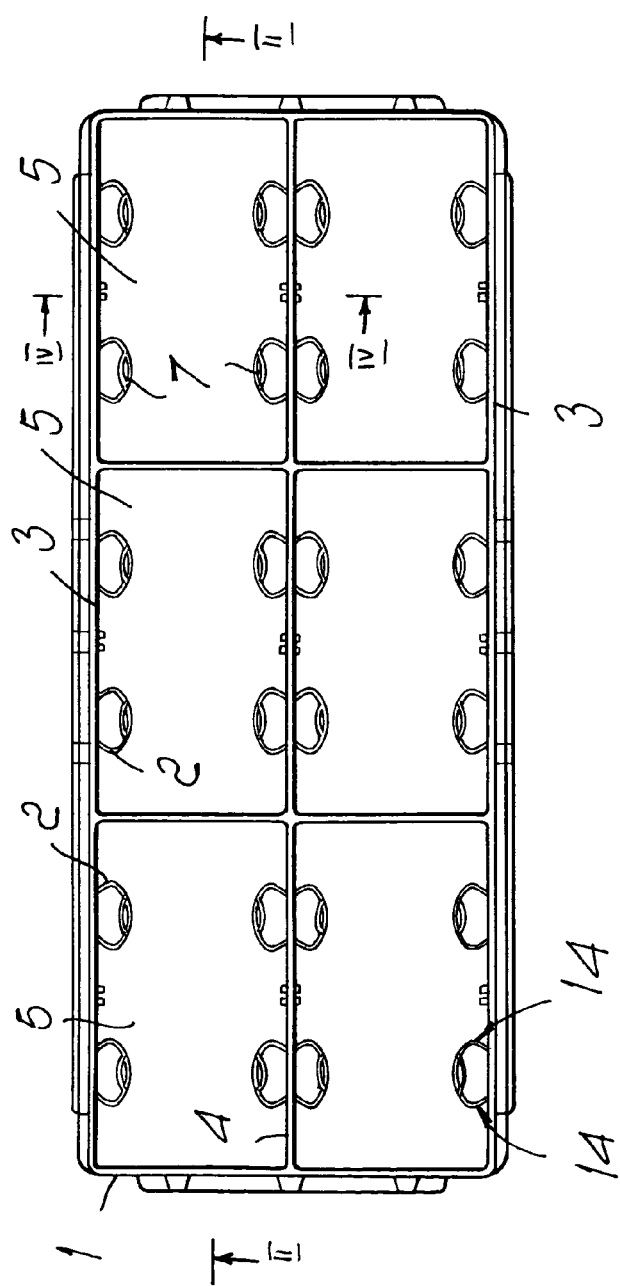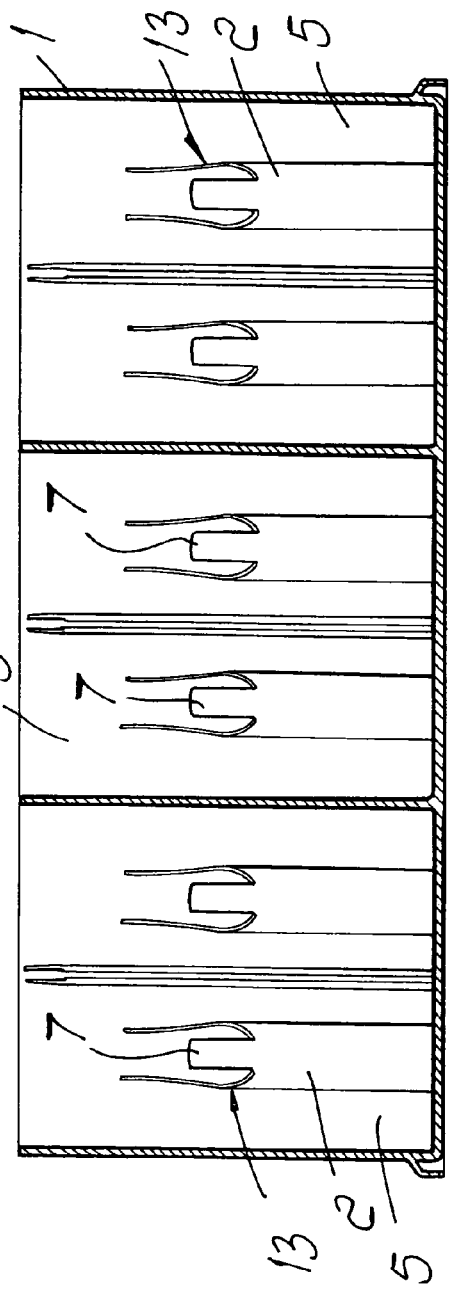

ACCUMULATOR BATTERY CONTAINER WITH PLATE INSERTION SYSTEM, AND PLATE INSERTING METHOD

The present invention relates to an accumulator battery container with a system for inserting plates or groups of plates and to a method for inserting said plates.

BACKGROUND OF THE INVENTION

It is known that electric batteries of the accumulator type, particularly lead batteries, are constituted by mutually connected cells or accumulators, each of which is composed of at least one pair of plates, an anode and a cathode, immersed in electrolyte. Separators, generally constituted by thin diaphragms, are usually inserted between the positive and negative plates in order to prevent plates of opposite polarities from coming into mutual contact.

Said batteries are built by using containment enclosures that can be closed with appropriate lids; the entire assembly is made of high-strength plastics in order to minimize, barring exceptionally forceful impacts, the possibility of cracking or breakage, also due to internal overpressure.

The most widely used plastic materials are propylene-ethylene copolymers, such as polypropylene, which has excellent mechanical strength, satisfactory behavior with respect to temperature variations and to the action of acids, solvents, oils, et cetera, and can be heat-sealed.

Other plastic materials that have these properties can of course be used to manufacture containment enclosures or containers.

The structure of such battery containers is of the monolithic type, obtained usually by molding and with generally standardized external shapes, having a rectangular or square cross-section.

The monolithic part is divided internally into compartments that form the cells suitable to contain the groups of plates, their supports and the corresponding electrolyte.

The plate is the unit that on its own, or combined with other identical plates, constitutes one of the electrodes. Each plate is identically formed by a supporting grid and by the active material that is the main solid component, in which the electrochemical reactions, on which the operation of the battery is based, take place.

The battery element is formed by a set of positive and negative plates with separators interposed, said plates being welded to each other in a parallel configuration by means of a bridge, multiple elements being then interconnected in series by way of connectors.

Such elements or packs of plates, which can have variable thicknesses or widths, are inserted, preferably wrapped in respective plastic bags, and are accommodated in the respective containment cells of the monolithic part.

Since the plates are constituted by grids made of lead-based alloys, which are rather soft and heavy, and onto which the active material is applied, they are particularly sensitive to mechanical stresses such as impacts, compressions, friction, shearing or vibration.

It is therefore very important to insert the packs of plates, during assembly of the battery, as nontraumatically as possible and to fix them in position against movements and vibration once they have been inserted in their respective cells.

Containers are known which have various systems for keeping the plates in position, such as protrusions or locking elements, inserted in the cells. Said plates must have dimensions that allow to insert them with limited play between the walls of the cells in order to prevent any movement thereof.

In any case, the plates must be inserted very carefully and by highly skilled individuals, since the guiding or locking protrusions of the plates have edges that easily tear the wrappers of the plates or even the plates themselves.

These problems have been partially solved in the known art by providing resilient elements for supporting or locking the plates, such as saddles (see EP-A-543416) or pads for horizontally stacked plates (see U.S. Pat. No. 4,603,093) or also tear-resistant reinforced wrappers for said plates (see U.S. Pat. No. 4,663,253 or U.S. Pat. No. 4,788,113).

Since containers and/or plates are currently often manufactured by different manufacturers, and are possibly assembled by yet another battery manufacturer, even small size variations of the plates sometimes make their insertion and fixing in the corresponding containers impossible or defective.

Furthermore, it is known that during the active life of the battery, the grids, especially the positive ones, may increase in size, particularly due to corrosion processes.

SUMMARY OF THE INVENTION

The aim of the present invention is therefore to eliminate the drawbacks noted above in the manufacture and assembly of known types of accumulator battery, by providing a container with a plate insertion system that avoids tearing or any damage thereto, even by non-expert individuals.

Another object of the invention is to provide a container that is provided with a system that allows easy and safe insertion of plates even with significant size variations.

Another object of the invention is to provide a system for fixing and immobilizing plates or packs of plates, even if they have different widths and thicknesses, the battery containers having measurements according to the standards currently applicable in the most disparate countries, and for various applications.

Another object of the invention is to provide a battery container with a system that ensures easy insertion and effective fixing thereof in the containment cells that is simple and low in cost to manufacture with means that are conventional in the manufacture of accumulator batteries.

This aim and these and other objects are achieved by the accumulator battery container according to the invention, constituted by a box-like structure that comprises internally at least one containment cell for at least one plate, said at least one cell being formed between opposite walls or between opposite walls and partitions of the container, characterized in that it comprises adaptable guiding means for inserting and fixing in position said at least one plate, said guiding and fixing means being arranged at opposite ends of said at least one cell and being formed so that they can undergo elastic deformation gradually when said at least one plate is inserted between them by pushing.

One method for the insertion of at least one plate or pack of plates in the container of an accumulator battery according to the invention, in which the container has a box-like structure and is internally provided with at least one cell for containing at least one plate or set of plates formed between opposite walls or between opposite walls and opposite partitions of the container, and with adaptable guiding means for inserting and fixing in position said at least one plate or pack of plates that are constituted so that they can be deformed elastically and gradually upon insertion of said at least one plate or pack of plates, is characterized in that it comprises the steps of:

a) inserting a plate or pack of plates between said guiding means for inserting and fixing in position said at least one cell;

b) pushing and producing the downward advancement in the cell of said plate or pack of plates, so as to expand the space defined between the guiding means for insertion and fixing in position that are arranged mutually opposite in said cell by gradual elastic deformation thereof as the plate or pack of plates advances; and c) positioning and fixing in position in said cell the plate or pack of plates fully inserted by elastic adaptation between said mutually opposite guiding means for insertion and fixing in position.

BRIEF DESCRIPTION OF THE DRAWINGS

Further characteristics and advantages of the invention will become better apparent from the description of preferred but not exclusive embodiments of a container for an accumulator battery with a plate insertion system, illustrated by way of nonlimiting example in the accompanying drawings, wherein:

FIG. 1 is a top view of a battery container according to the invention;

FIG. 2 is a sectional view, taken along the longitudinal plane II-II, of the container of FIG. 1;

FIG. 9 is a sectional view of a detail of the region where the guiding means for plate insertion are joined to the base of the battery container, according to the invention.

DESCRIPTION OF THE PREFERRED EMBODIMENTS

Figure 3:
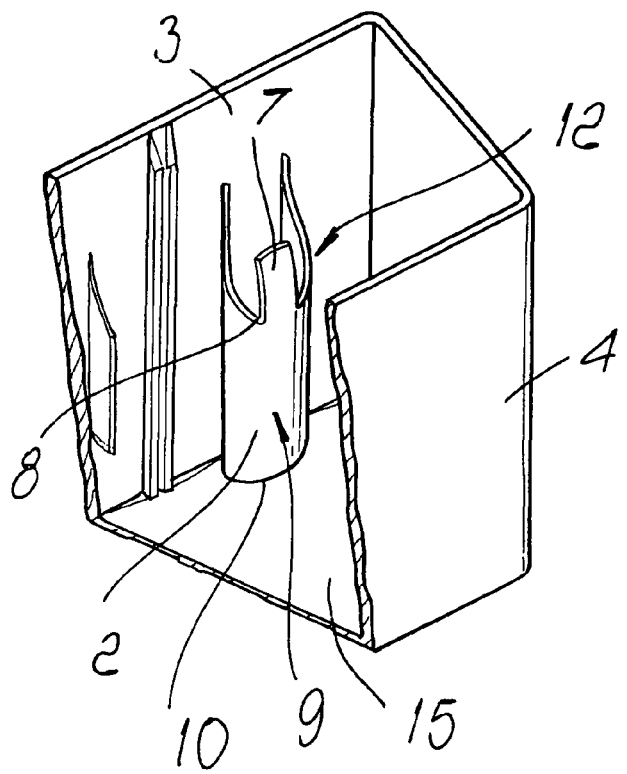
FIG. 3 is a partially cutout perspective view of a detail of a cell of the container of FIG. 1.
Figure 4:
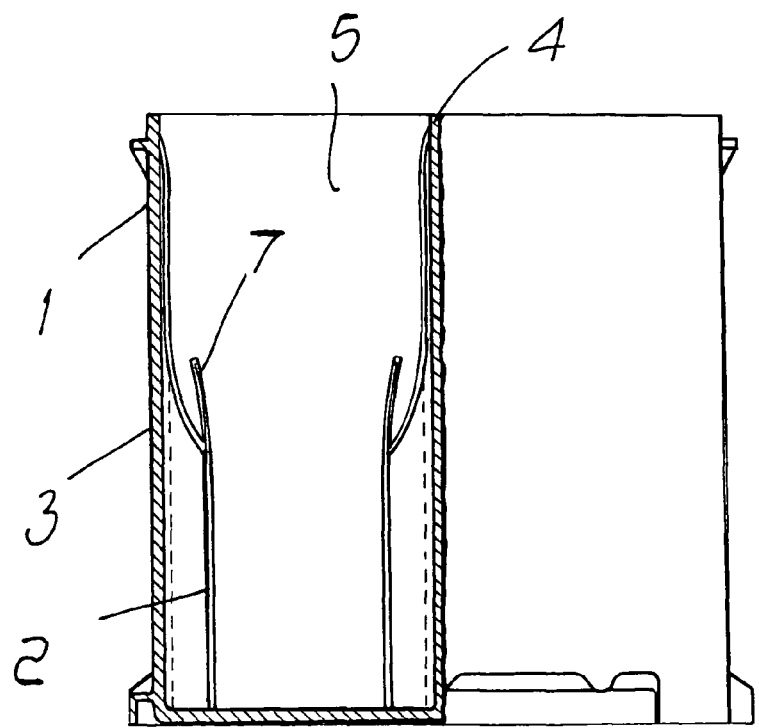
FIG. 4 is a transverse sectional view, taken along the plane IV-IV of the container of FIG. 1.

With reference to FIGS. 1-4, the accumulator battery container of the monolithic type, generally designated by the reference numeral 1, is constituted by a box-like structure that comprises internally at least one containment cell 5, and preferably but not exclusively a plurality of containment cells 5 for at least one plate 6, which is formed between opposite walls 3 or between opposite walls 3 and partitions 4 of the container. The container is further provided with adaptable guiding means 2, 7 for inserting and fixing in position at least one plate or pack of plates, the guiding and fixing means being arranged at opposite ends of each containment cell of the plurality of cells 5 and being constituted so that they can be deformed elastically and gradually when the plate or pack of plates 6 is inserted between them by pushing.

The guiding means for insertion and fixing in position are constituted by flexible ridges 2, which are arranged so as to protrude from respective opposite walls 3, or opposite walls 3 and partitions 4, of each containment cells of the plurality of containment cells 5, so as to run vertically along the walls/ partitions and flex away from each other gradually when the plate or pack of plates 6 is inserted.

At the upper part of each flexible ridge 2 there is at least one flexible flap 7 that is inclined toward the wall 3 or partition 4 from which the respective flexible ridge 2 protrudes.

The flexible ridges 2 provided in each one of the containment cells 5 of the container 1 are shaped, in transverse cross-section, substantially like a vertical tubular structure 9 that has an elastically compliant behavior, with an omega-shaped transverse cross-section with feet 14 that are connected to the corresponding wall 3 of the respective containment cell 5. The respective flap 7 connected to the ridge 2 is connected, by means of a root portion 8, at the upper part of the tubular structure 9.

Figure 8:
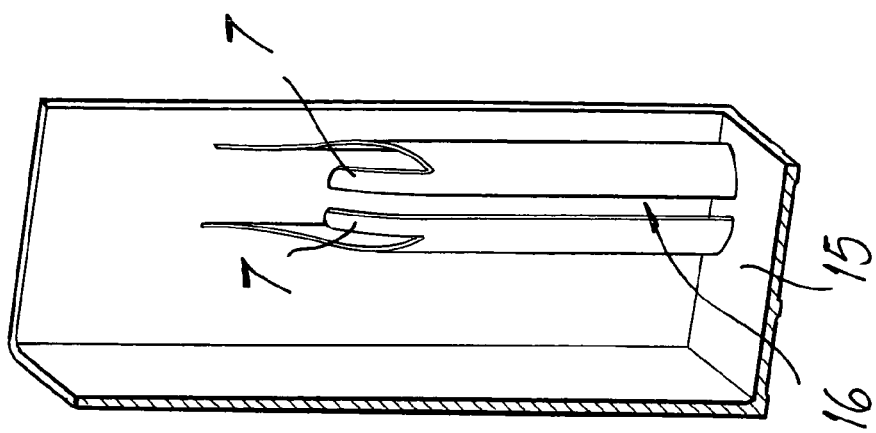
FIG. 8 is a partial cutout perspective view of a detail of a cell of the battery container of FIG. 7.
Figure 7:
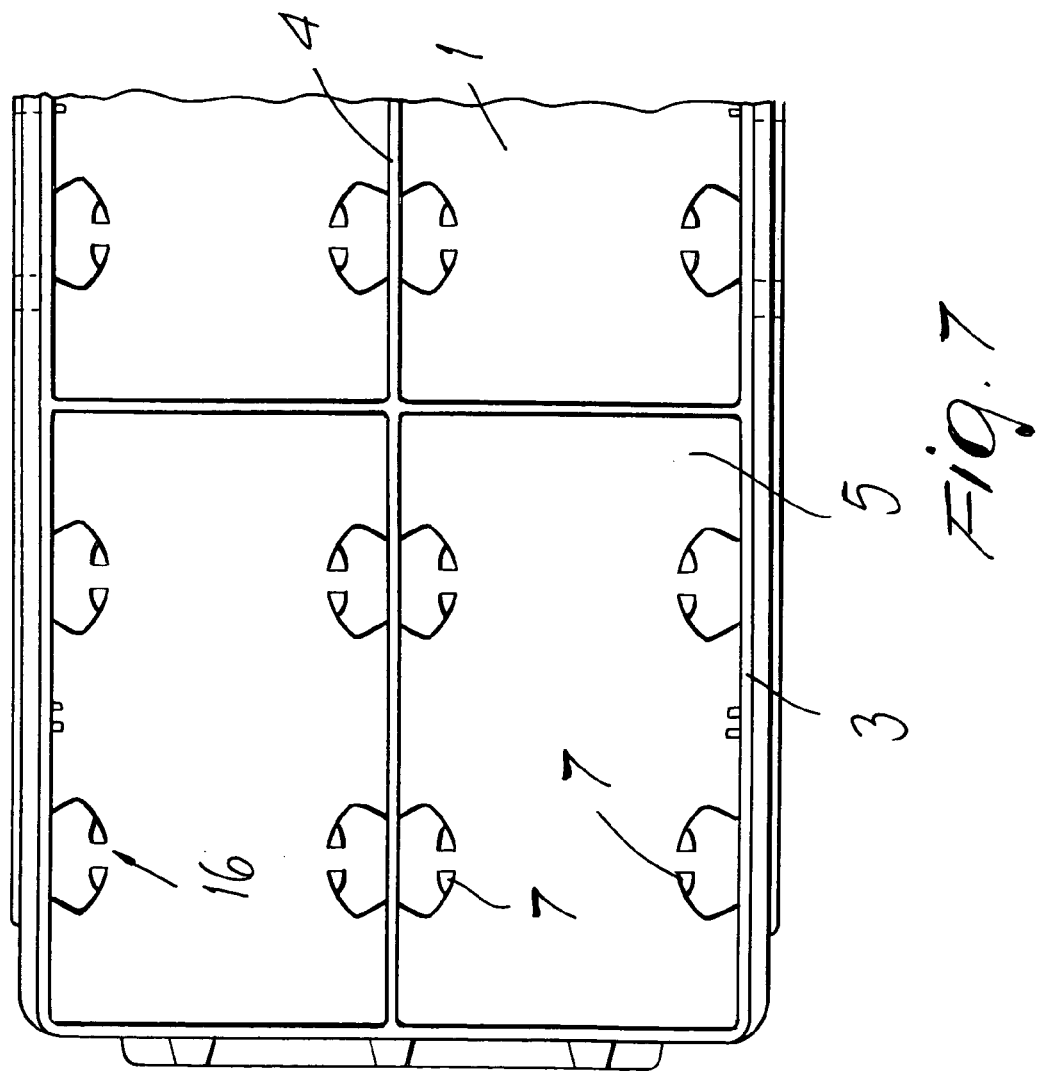
FIG. 7 is a partial top view of a battery container in a second embodiment according to the invention.

In a second alternative embodiment of the container 1, shown in FIGS. 7-8, the flexible ridges 2 are shaped, in transverse cross-section, substantially like a vertical tubular structure 9, with an omega-shaped transverse cross-section that is open in the crest region and forms a vertical slot 16 along the tubular structure 9 and with feet 14 that are connected to the corresponding wall 3 of the respective containment cell 5.

Two flaps 7 are further provided, each of which is connected by means of a root portion 8 thereof at the upper part of the tubular structure 9 to a respective side of the vertical slot 16. Advantageously, the tubular structure 9 is connected to the bottom 15 of the container 1 at a lower part thereof, constituting along a horizontal plane a connecting region 10 that has a closed perimeter. In its upper part, the tubular structure 9 ends with a rim 13 that lies on an inclined plane which slopes downward from the region where the tubular structure 9 connects to the wall 3 or respective partition 4 toward the opposite wall or partition 4, the respective flap 7 protruding from the lowest part of the rim 13 and protruding in an inclined position above the rim 13 so as to form an inclined guiding surface or plane 12 for the insertion of the plate or pack of plates 6.

The guiding means 2, 7 for insertion and fixing in position are shaped so as to receive by insertion and fix in position packs of plates 6 arranged mutually side by side which form groups of plates having a variable width or thickness.

The walls 3 and partitions 4 have thicknesses that can be, in preferred embodiments, approximately equal to 3 mm; the ridges 2 of the flaps 7 also have, in a preferred embodiment, a thickness of approximately 0.5 mm.

Furthermore, each one of the containment cells 5 has at least two, preferably four, tubular structures 9 arranged on opposite walls 3 and/or partitions 4, at mutual distances that are selected so as to define minimum and maximum accommodation volumes for a plate or multiple plates that form groups or packs of plates 6, said volumes corresponding to the non-flexed and fully-flexed configurations, respectively, of the flexible ridges 2.

If required by the manufacture of the container and by the physical and chemical properties of the materials of which it is made, it is obviously possible to provide more than four tubular structures 9 in each cell 5. It is in any case possible to provided the tubular structures 9 also in odd numbers, for example three, five, et cetera.

In the closed-perimeter region 10 that connects the tubular structure 9 to the bottom of the container 1 it is possible to provide a narrower or reduced thickness region 11 that is shaped and formed so as to break, thus interrupting its contact with the bottom 15 of the container, when the plate or pack of plates 6 is fully inserted.

In the narrower region 11, the flexible ridges 2 have a greatly reduced thickness with respect to the ridges, for example 0.1 mm.

The container 1 might advantageously be made of a plastic material, preferably polypropylene, with a monolithic structure that includes the ridges 2 and the flaps 7, all this being provided by molding.

It is therefore evident that the container 1 according to the invention has the particularity that it is provided with a system for the insertion and fixing in position of plates or packs of plates 6 in an accumulator battery, the system comprising a container 1 that has a box-like structure and is provided internally in a preferred but not exclusive embodiment with a plurality of containment cells 5 formed between opposite walls or between opposite walls or partitions 4 of the container 1, and adaptable guiding means 2, 7 for the insertion and fixing in position of at least one plate or pack of plates 6, the guiding means for insertion and fixing in position being arranged at opposite ends of each cell of said plurality of containment cells 5 and being built so that they can be deformed elastically and gradually when the plate or group of plates 6 is inserted between them by pushing.

From what has been described above, which relates to the structure of the battery container 1, the invention also provides an efficient and in turn simple method for inserting at least one plate or pack of plates 6 in the containment cells 5, shown in FIGS. 5A to 5D.

The method comprises the steps that consist in inserting a plate or pack of plates 6 between the guiding means 2, 7 for insertion and fixing in position of one of the cells 5; in pushing the plate or pack of plates 6 and making it advance downward in the cell so as to widen the space formed between the guiding means for insertion and fixing in position that are located opposite in the cell 5 by gradual elastic deformation thereof; in producing the advancement of the plate or pack of plates; in positioning and fixing in position in the cell 5 the plate or pack of plates 6 fully inserted by elastic adaptation between the mutually opposite guiding means 2, 7 for insertion and fixing in position.

At the beginning of the insertion process, the plate or pack of plates 6 is rested, in order to start the insertion guiding, on the inclined insertion guiding surfaces 12 provided by the flaps 7, which are inclined appropriately, forming so a guiding funnel, and to avoid offering and/or concealing any sharp edge that might tear the wrapper of the plate or pack of plates 6 or the plates themselves.

Figure 5:
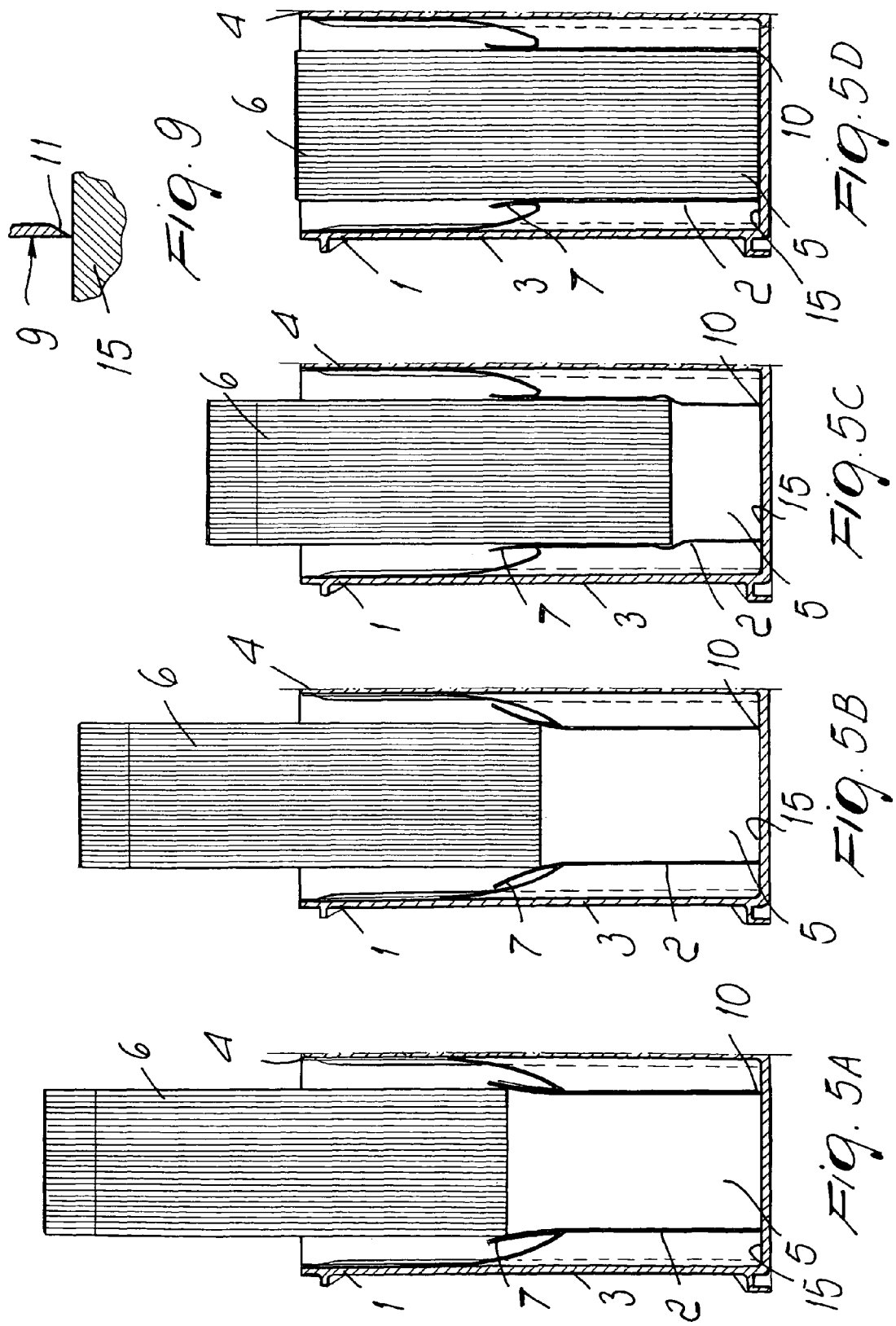
FIGS. 5a to 5d are sectional views, taken along a transverse plane, of the various steps of the insertion of a pack of plates in a cell of a battery container according to the invention.
Figure 6:
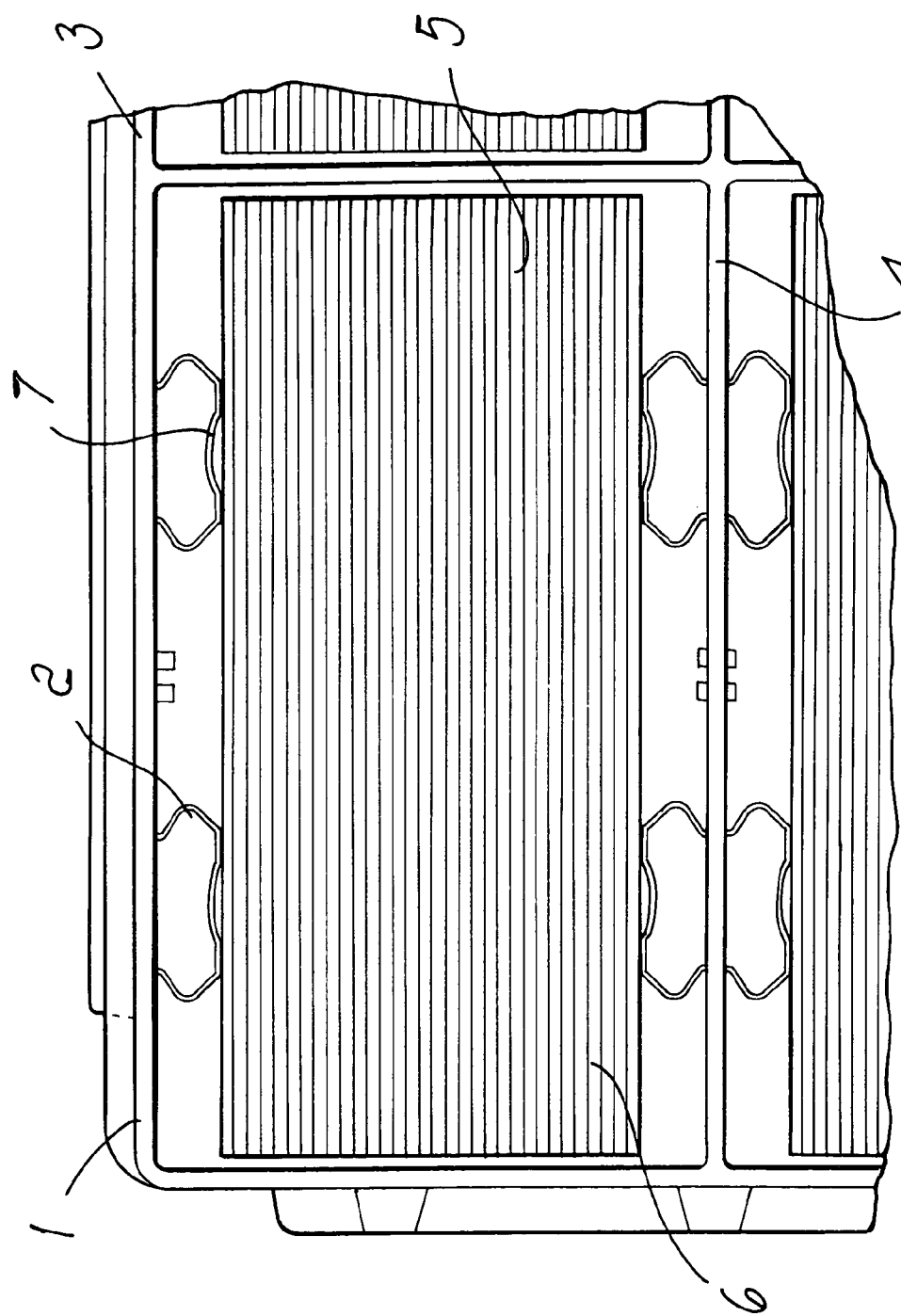
FIG. 6 is a partial top view, illustrating a battery cell with the pack of plates inserted, according to the invention.

As shown in FIG. 5D, at the end of step for the insertion of the plates 6, by producing the breakage and separation of the ridges 2 of the tubular structure 9 in the narrower region 11, the pack of plates 6 is rested on the bottom 15 of the container 1 so that the pack of plates 6 is fixed and centered in the final position in an elastic and adaptable manner between the appropriately flexed tubular structures 9.

In practice it has been found that the container and the method according to the invention as described above can provide easily and effectively both an insertion of the plates of accumulator batteries that is resistant to traumatic events and a fixing in position thereof that ensures good impact and vibration protection, suitable to extend considerably the active life of the batteries.

The invention thus conceived is susceptible of numerous modifications and variations, all of which are within the scope of the inventive concept as defined by the appended claims.

Furthermore, all the details, such as the transverse sectional shapes of the tubular structure 9, the dimensions and number thereof and of the containment cells 5, and the materials of which they are made, can be changed, provided that the guiding and adaptable accommodation of the plates 6 in the containment cells 5 and an elastic fixing in position thereof are ensured, said variations being in any case within the scope of the appended claims.

It is therefore evident that the person skilled in the art may replace said details and others with other technically equivalent elements.

The disclosures in Italian Patent Application No. MI2003A001751 from which this application claims priority are incorporated herein by reference.

What is claimed is:

1. An accumulator battery container, constituted by a box-like structure that comprises: at least one internal containment cell for at least one plate, said at least one cell being formed between opposite walls or between opposite walls and partitions of the container; and adaptable guiding means for guiding insertion and fixing in position of said at least one plate that are constituted by flexible ridges arranged so as to protrude from respective opposite walls or from the opposite wall and partition of said at least one cell and to run vertically along said walls or partitions and so as to flex away from each other, gradually, upon insertion of said at least one plate, each said flexible ridge being provided at an upper part thereof with at least one flexible flap inclined toward the wall or partition from which the respective flexible ridge protrudes, and said flexible ridges further having, in a transverse cross-section, a shape of a vertical tubular structure with an omega-shaped transverse cross-section, said tubular structure having feet that are connected to a corresponding wall of the respective containment cell, said at least one flap being connected by way of a root portion at an upper part of said tubular structure, and wherein said adaptable guiding and fixing means are arranged at opposite ends of said at least one cell, said adaptable guiding means being formed so as to undergo elastic deformation gradually when said at least one plate is inserted therebetween by pushing.

2. The container of claim 1, wherein said ridges have said shape with said omega-shaped transverse cross-section that is open in a crest region thereof, so that said tubular structure is provided with a vertical slot along a vertical extension thereof and with feet that connect to a corresponding wall of the respective containment cell.

3. The container of claim 2, comprising two said flaps, each of which is connected at the upper part of said tubular structure, to a respective side of said vertical slot.

4. The container of claim 1, having a bottom, said tubular structure being connected to said bottom at a lower part thereof, and constituting, along a horizontal plane, a closed-perimeter connecting region, the upper part of the tubular structure ending with a rim that is arranged in an inclined plane that slopes downward from a region where said tubular structure joins the respective wall or partition toward the opposite wall or partition, said at least one flap rising from a lowest part of said rim and protruding in an inclined position above said rim so as to form an inclined guiding surface for guiding insertion of said at least one plate.

5. The container of claim 4, wherein said tubular structure comprises in said closed-perimeter connecting region a narrower region that is shaped and formed so as to break contact between said tubular structure and the bottom of the container, upon full insertion of said at least one plate.

6. The container of claim 5, wherein, at said narrower region, said ridges that form said tubular structure have a thickness of about 0.1 mm.

7. The container of claim 1, wherein said adaptable guiding means for insertion and fixing in position are shaped so as to receive upon insertion and fix in position packs of plates arranged mutually side by side, which form sets of plates having variable width or thickness.

8. The container of claim 1, wherein said walls and/or partitions have thicknesses of about 3 mm, said ridges and said flaps having a thickness of about 0.5 mm.

9. The container of claim 1, wherein said at least one cell is provided with at least two, preferably four, tubular structures that are arranged on said opposite walls and/or partitions at mutual distances that are selected so as to produce minimum and maximum volumes for accommodating said at least one plate, said minimum and maximum volumes corresponding to a non-flexed and, respectively, fully-flexed configuration of said flexible ridges.

10. The container of claim 1, having a monolithic structure that includes said ridges and said flaps, said monolithic structure being a molded formed structure.

11. The container of claim 10, made of a plastic material, preferably polypropylene, together with said ridges and said flaps.

12. A system for inserting and fixing in position plates or packs of plates in an accumulator battery, comprising a container with a box-like structure that is provided internally with at least one containment cell formed between mutually opposite walls or between opposite walls and partitions of the container, the system comprising adaptable guiding means for guiding insertion and fixing in position of at least one plate that are constituted by flexible ridges that are arranged so as to protrude from respective opposite walls or an opposite wall and partition of said at least one cell, so as to run vertically along said walls or partitions and flex away from each other gradually upon insertion of said at least one plate, each said flexible ridge being provided at an upper part thereof with at least one flexible flap inclined toward the wall or partition from which the respective flexible ridge protrudes, and said flexible ridges further having, in a transverse cross-section, a shape of a vertical tubular structure, with an omega-shaped transverse cross-section, said tubular structure having feet that are connected to a corresponding wall of the respective containment cell, said at least one flap being connected, by way of a root portion thereof, at an upper part of said tubular structure , and wherein said adaptable guiding means for insertion and fixing being arranged at opposite ends of said at least one cell and being formed so as to deform elastically and gradually upon pushing insertion therebetween of said at least one plate.

13. The system of claim 12, wherein said ridges have said shape with said omega-shaped transverse cross-section that is open in a crest region, so that said tubular structure is provided with a vertical slot that extends vertically along said tubular structure and with feet that are connected to the corresponding wall of the respective containment cell.

14. The system of claim 13, comprising two said flaps, each of which is connected at the upper part of said tubular structure, to a respective side of said vertical slot.

15. An accumulator battery container, constituted by a box-like structure that comprises: at least one internal containment cell for at least one plate, said at least one cell being formed between opposite walls or between opposite walls and partitions of the container; adaptable guiding means for guiding insertion and fixing in position of said at least one plate that are constituted by flexible ridges arranged so as to protrude from respective opposite walls or from the opposite wall and partition of said at least one cell, and to run vertically along said walls or partitions and so as to flex away from each other, gradually, upon insertion of said at least one plate; and at least one flexible flap that is provided at an upper part of each one of said flexible ridges and is inclined toward the wall or partition from which the respective flexible ridge protrudes, said ridges having, in a transverse cross-section, substantially a shape of a vertical tubular structure with an omega-shaped transverse cross-section that is open in a crest region thereof, said tubular structure being provided with a vertical slot along a vertical extension thereof and with feet that connect to a corresponding wall of the respective containment cell, and wherein said adaptable guiding and fixing means are arranged at opposite ends of said at least one cell, said adaptable guiding means being formed so as to undergo elastic deformation gradually when said at least one plate is inserted therebetween by pushing.

16. An accumulator battery container, constituted by a box-like structure that has a bottom and comprises: at least one internal containment cell for at least one plate, said at least one cell being formed between opposite walls or between opposite walls and partitions of the container; adaptable guiding means for guiding insertion and fixing in position of said at least one plate that are constituted by flexible ridges having, in a transverse cross-section, substantially a shape of a vertical tubular structure and being arranged so as to protrude from respective opposite walls or from the opposite wall and partition of said at least one cell, and to run vertically along said walls or partitions and so as to flex away from each other, gradually, upon insertion of said at least one plate; at least one flexible flap that is provided at an upper part of each one of said flexible ridges and is inclined toward the wall or partition from which the respective flexible ridge protrudes, said tubular structure being connected to the bottom of the container at a lower part thereof, and constituting, along a horizontal plane, a closed-perimeter connecting region, an upper part of said tubular structure ending with a rim that is arranged in an inclined plane that slopes downward from a region where said tubular structure joins the respective wall or partition toward the opposite wall or partition, said at least one flap rising from a lowest part of said rim and protruding in an inclined position above said rim so as to form an inclined guiding surface for guiding insertion of said at least one plate, and wherein said adaptable guiding and fixing means are arranged at opposite ends of said at least one cell, said adaptable guiding means being formed so as to undergo elastic deformation gradually when said at least one plate is inserted therebetween by pushing.

* * * * *